G. L. PAGE.
Culinary-Vessel.
No. 129,293.
Patented July 16, 1872.
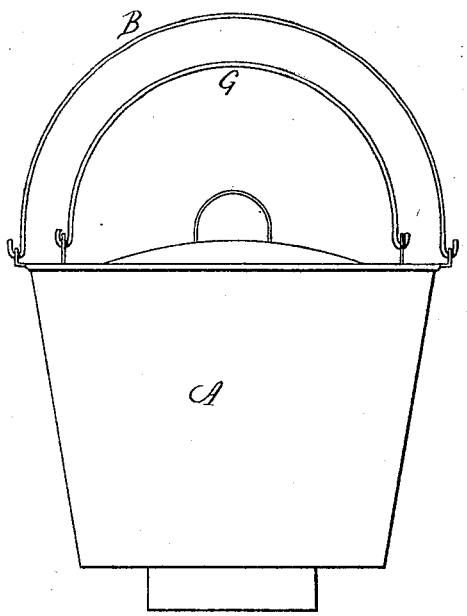
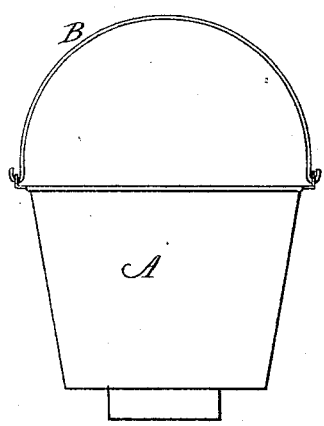
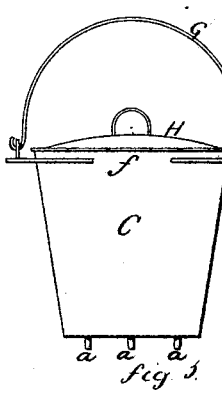
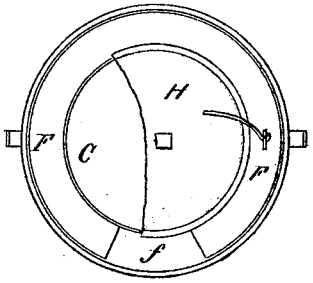
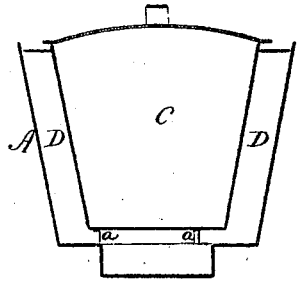
Witnesses.
Geo. L. Page, Inventor
By Atty.

UNITED STATES PATENT OFFICE.

GEORGE L. PAGE, OF WALLINGFORD, CONNECTICUT.

IMPROVEMENT IN CULINARY VESSELS.

Specification forming part of Letters Patent No. 129,293, dated July 16, 1872.

*To all whom it may concern:*

Be it known that I, GEORGE L. PAGE, of Wallingford, in the county of New Haven and State of Connecticut, have invented a new Improvement in Culinary Vessels; and I do hereby declare the following, when taken in connection with the accompanying drawing and the letters of reference marked thereon, to be a full, clear, and exact description of the same, and which said drawing constitutes part of this specification and represents, in—

Figure 1, a side view of the kettle complete; Fig. 2, a side view of the outer kettle; Fig. 3, a side view of the inner kettle; Fig. 4, a top view; and in Fig. 5, a vertical central section.

This invention relates to an improvement in that class of utensils for cooking which consist of one vessel within another, the inner to be heated through the medium of water placed between the two; the object being, in the use of porcelain-lined kettles, to prevent the injury which occurs when the kettle becomes dry under the heat; and the invention consists in an outer and inner kettle, the inner kettle smaller than the outer, so as to form a chamber or space between the two, and with a bearing at the bottom to support the inner kettle in its proper relative position; and the said inner kettle provided with a flange around its upper edge to set into the outer kettle and serve as a guide for placing the inner kettle in a central position, the said flange connected with an opening into the space beneath, through which water may be supplied to the outer kettle at any time without removing the inner kettle.

A is the outer or principal kettle, fitted to set onto the heating apparatus, and with a bail, B, in the usual manner for common cast-iron kettles. C is the inner kettle, also formed from cast metal, with legs or equivalent supports, a, to rest upon the bottom of the principal kettle and support the said inner kettle a short distance above the outer kettle, and so as to leave a space or chamber, D, entirely around between the two kettles. Near the upper edge of the kettle C a flange, F, is cast extending nearly around the kettle, leaving only a space, f, open. The external diameter of this flange corresponds to but must not be greater than the internal diameter of the outer kettle at the point where the said flange stands when the inner kettle rests upon the bottom, as before described. This flange serves only as a guide to govern the central position of the kettle, but in no way supports the weight of the kettle. This kettle is provided with a cover, H, in the usual manner for common cast-iron kettles. The kettle is placed in position and the space between the kettles supplied with water through the openings a at any time when replenishing shall be necessary.

By this construction the porcelain lining of the inner kettle cannot possibly come into direct contact with the heating-surface, and therefore cannot be injured by such heat, though the inner kettle be entirely empty or dry.

I claim as my invention—

The herein-described cooking utensil, consisting of the outer kettle A and inner kettle C, the said inner kettle supported entirely from the bottom, and also provided with a flange, F, at or near its upper edge, and with an opening, f, through the said flange into the space between the two kettles, substantially as specified.

GEORGE L. PAGE.

Witnesses:
 FRANKLIN PLATT,
 WALTER BEACH.